(12) United States Patent
Jeon et al.

(10) Patent No.: US 12,508,344 B2
(45) Date of Patent: Dec. 30, 2025

(54) COMPOSITION FOR RESTORATION OF TISSUE INCLUDING BIODEGRADABLE POLYMERIC COPOLYMER

(71) Applicant: ROSE LAB. CO., LTD, Seoul (KR)

(72) Inventors: Hyeon Jin Jeon, Uijeongbu-si (KR); Woo Seong Lee, Goyang-si (KR)

(73) Assignee: ROSE LAB. CO., LTD, Seoul (KR)

( * ) Notice: Subject to any disclaimer, the term of this patent is extended or adjusted under 35 U.S.C. 154(b) by 508 days.

(21) Appl. No.: 17/760,125

(22) PCT Filed: Jan. 28, 2021

(86) PCT No.: PCT/KR2021/001140
§ 371 (c)(1),
(2) Date: Aug. 4, 2022

(87) PCT Pub. No.: WO2021/162292
PCT Pub. Date: Aug. 19, 2021

(65) Prior Publication Data
US 2023/0053224 A1 Feb. 16, 2023

(30) Foreign Application Priority Data
Feb. 13, 2020 (KR) .................. 10-2020-0017931

(51) Int. Cl.
*A61L 27/18* (2006.01)
*A61L 27/50* (2006.01)
(Continued)

(52) U.S. Cl.
CPC .............. *A61L 27/18* (2013.01); *A61L 27/50* (2013.01); *C08L 67/04* (2013.01); *C08L 71/02* (2013.01);
(Continued)

(58) Field of Classification Search
None
See application file for complete search history.

(56) References Cited

U.S. PATENT DOCUMENTS

2017/0197012 A1  7/2017 Chun et al.
2017/0319458 A1  11/2017 Matsufuji et al.

FOREIGN PATENT DOCUMENTS

CN   101890162 B   6/2018
EP   2766407 B1    6/2018
(Continued)

OTHER PUBLICATIONS

English language translation of WO 2016/043547 A1, Publ. Mar. 24, 2016. (Year: 2016).*

(Continued)

*Primary Examiner* — Dominic Lazaro
(74) *Attorney, Agent, or Firm* — MEDLER FERRO WOODHOUSE & MILLS PLLC

(57) ABSTRACT

The present invention provides a composition for restoration of tissue including a biodegradable polymeric copolymer which is obtained by polymerizing a hydrophobic biodegradable polymer and a hydrophilic biodegradable polymer. The composition of the present invention has excellent tissue restoration effects because of high collagen production rate without occurrence of nodules even when injected directly into the dermis, unlike the conventional composition for restoration of tissue.

3 Claims, 3 Drawing Sheets

Comparative Example 1

Comparative Example 2

Example

(51) Int. Cl.
*C08L 67/04* (2006.01)
*C08L 71/02* (2006.01)

(52) U.S. Cl.
CPC ....... *A61L 2400/06* (2013.01); *A61L 2430/34* (2013.01); *C08L 2201/06* (2013.01); *C08L 2203/02* (2013.01)

(56) References Cited

FOREIGN PATENT DOCUMENTS

| | | |
|---|---|---|
| KR | 10-2015-0007051 A | 1/2015 |
| KR | 10-2015-0010464 A | 1/2015 |
| KR | 10-2016-0028834 A | 3/2016 |
| KR | 10-2016-0033897 A | 3/2016 |
| KR | 10-2016-0107780 A | 9/2016 |
| KR | 10-2016-0122111 A | 10/2016 |
| KR | 10-2017-0094345 A | 8/2017 |
| KR | 10-2077078 B1 | 2/2020 |
| WO | WO-2016043547 A1 * | 3/2016 ............... A61F 2/10 |

OTHER PUBLICATIONS

English translation of International Search Report issued in PCT/KR2021/001140, dated May 4, 2021.

\* cited by examiner

COMPOSITION FOR RESTORATION OF TISSUE INCLUDING BIODEGRADABLE POLYMERIC COPOLYMER

BACKGROUND OF THE INVENTION

1. Field of the Invention

The present invention relates to a composition for restoration of tissue including a biodegradable polymeric copolymer, and more particularly, to a composition for restoration of tissue including a biodegradable polymeric copolymer, wherein the biodegradable polymeric copolymer is a copolymer obtained by polymerizing a hydrophobic biodegradable polymer and a hydrophilic biodegradable polymer, then performing self-assembly in an aqueous solution to form nanoparticles, such that nodules during intradermal or subcutaneous injection may be prevented.

2. Description of the Related Art

Conventional injectable formulations for restoration of tissue include tissue restoration microparticles having a particle diameter of 25 to 50 μm. This is intended to prevent microfine microspheres or particulates from being destroyed by macrophages and is highly related to the persistence of restoration effects. However, micro-sized tissue restoration materials may cause diverse side effects, and hemolysis disorders or nodules of tissues at the injection site due to ischemia or mass compression effect are known as typical side effects. Existing tissue restoration materials are recommended to inject into a subcutaneous fat layer having relatively few fibroblasts rather than the dermal layer with a lot of fibroblasts involved in collagen production due to concerns about side effects, and require high skill of the operator. Injecting the tissue restoration microparticles into the dermis to help collagen production such as commercial products of polycaprolactone or polylactic acid, is highly likely to cause nodules.

Prior art related thereto include, for example, Korean Patent Laid-Open Publication No. 10-2016-0107780 (Composition for restoration of tissue) and Korean Patent Publication No. 10-2015-0010464 (Injections for restoration of tissue including a polymer obtained by polymerizing a hydrophobic biodegradable polymer and a hydrophilic biodegradable polymer). However, these prior arts are very likely to cause nodules due to recombination between hydrophobic biodegradable polymers when a weight ratio of the hydrophobic biodegradable polymer is high.

In order to solve the above-described problems, it is urgent to develop a product for restoration of tissue, which does not cause nodules eve after in vivo injection.

PRIOR ART DOCUMENT

Patent Document (Patent Document 1) Korean Patent Laid-Open Publication No. 10-2016-0107780
(Patent Document 2) Korean Patent Laid-Open Publication No. 10-2015-0010464

SUMMARY OF THE INVENTION

To solve the drawbacks of the conventional injectable formulations for tissue restoration described above, the present inventors have developed a composition for restoration of tissue including a biodegradable polymeric copolymer, which can inhibit nodules possibly occurring when a tissue restoration polymer material in an aqueous solution is subcutaneously injected. Therefore, it is an object of the present invention to provide a composition for restoration of tissue with excellent tissue restoration effects because of high collagen production rate without occurrence of nodules even when injected directly into the dermis.

In order to achieve the above object, the present invention provides a composition for restoration of tissue including a biodegradable polymeric copolymer.

Further, the present invention provides an injectable formulation for restoration of tissue, including the above-described composition for restoration of tissue.

The biodegradable polymeric copolymer may be a polymer obtained by polymerizing a hydrophobic biodegradable polymer and a hydrophilic biodegradable polymer.

The hydrophobic biodegradable polymer may be polycaprolactone, polylactic acid, polyglycolic acid, polydioxanone, polyhydroxybutyrate, or the like, but preferably, polycaprolactone.

The hydrophilic biodegradable polymer may be caboxymethyl cellulose (CMC), polyethyleneglycol, monomethoxy polyethyleneglycol, or the like without limitation thereof, but preferably, polyethyleneglycol, monomethoxy polyethyleneglycol.

The hydrophobic biodegradable polymer and the hydrophilic biodegradable polymer are preferably polymerized in a weight ratio of 10:20 to 10:50, and more preferably, in a weight ratio of 10:20 to 10:30.

The hydrophobic biodegradable polymer preferably has a number average molecular weight of 550 to 4,000 g/mol, and more preferably 750 to 1,500 g/mol.

The hydrophilic biodegradable polymer may have a number average molecular weight of 400 to 4,000 g/ml, and preferably 800 to 2,000 g/mol.

The copolymer obtained by polymerizing the hydrophobic biodegradable polymer and the hydrophilic biodegradable polymer may have a number average molecular weight of 2,000 to 16,000 g/mol, and preferably 2,500 to 5,000 g/mol.

The biodegradable polymeric copolymer obtained by polymerizing the hydrophobic biodegradable polymer and the hydrophilic biodegradable polymer may be included in an aqueous solution in an amount of 0.1 to 99% (w/w), preferably 0.1 to 50% (w/w), and more preferably 0.1 to 30% (w/w). If the amount thereof is out of the above range, it may cause a problem in skin injection using a syringe due to an increase in viscosity of the aqueous solution.

The biodegradable polymeric copolymer obtained by polymerizing the hydrophobic biodegradable polymer and the hydrophilic biodegradable polymer may be a sphere having a size of 50 to 100 nm, and preferably, a sphere having a size of 50 to 300 nm.

The copolymer may be prepared using a catalyst, and the catalyst may include stannous octoate, but it is not limited thereto.

In order to use the composition in the form an injectable formulation, the composition may further include any additive such as additives, solvents or gelling agents commonly used in the art.

The composition for restoration of tissue according to the present invention may have a high collagen production rate without occurrence of nodules even when injected directly into the dermis unlike the conventional composition for restoration of tissue, thereby achieving excellent tissue restoration effects.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, the present invention will be described in detail by the following examples and experimental examples.

However, the following examples and experimental examples are only illustrative of the present invention, and the content of the present invention is not limited thereto.

Comparative Example 1

Polycaprolactone-Carboxymethylcellulose Copolymer Microparticles

ELLANSE M (manufacturer: AQTIS Medical, vendor: JW Foreign Pharmaceuticals) in an aqueous solution, which includes polycaprolactone polymer microparticles and carboxymethyl cellulose in a weight ratio of 3:7, is an injectable formulation ("injection") consisting of polycaprolactone particles having an average particle diameter of about 50 µm.

Comparative Example 2

Formulation of Methoxy Polyethyleneglycol-Polycaprolactone Copolymer Particles After polymerizing 10 g of monomethoxy polyethyleneglycol (molecular weight: 1,000 g/mol) and 20 g of ε-caprolactone monomer in a weight ratio of 10:20 at 120° C. for 12 hours under 100 µl of stannous octoate catalyst, the product was cooled at room temperature to obtain a methoxy polyethyleneglycol-polycaprolactone copolymer having a molecular weight of 3,000 g/mol.

Distilled water at room temperature was added to the above prepared copolymer, followed by stirring and mixing the same so as to form nanoparticles by the polymer through self-assembly, and thereby obtaining a solution of copolymer at 30% (w/w) in an aqueous solution.

Example, Formulation of Methoxy Polyethyleneglycol-Polycaprolactone Copolymer Nanoparticles After polymerizing 21 g of monomethoxy polyethyleneglycol (molecular weight: 1,000 g/mol) and 10 g of ε-caprolactone monomer in a weight ratio of 21:10 at a temperature of 100° C. for 12 hours under 100 µl of stannous octoate catalyst, the product was cooled at room temperature to obtain a methoxy polyethyleneglycol-polycaprolactone copolymer having a molecular weight of 3,100 g/mol. Thereafter, distilled water at room temperature was added to the prepared copolymer, followed by mixing the same so as to form nanoparticles by the copolymer through self-assembly, and thereby obtaining a solution of copolymer at 30% (w/w) in an aqueous solution. The copolymer particles contained in the aqueous solution had an average particle diameter of 162 nm.

Experimental Example 1

Figure 1:
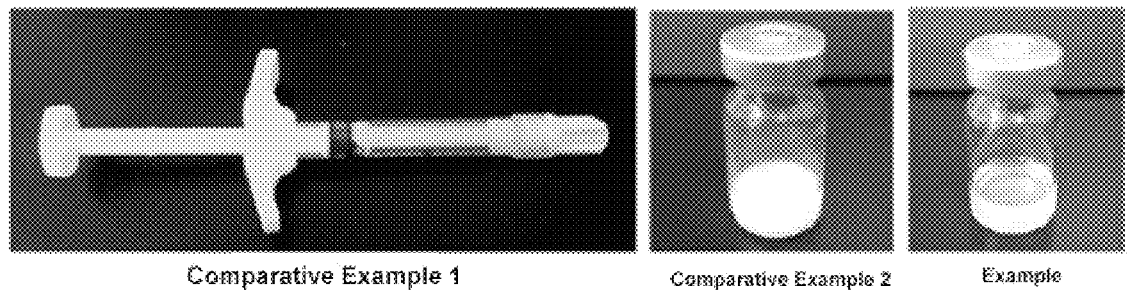
FIG. 1 is vial photographs showing an injectable formulation including a product of Comparative Example 1, and compositions including products of Comparative Example 2 and Example, respectively.
Figure 2:
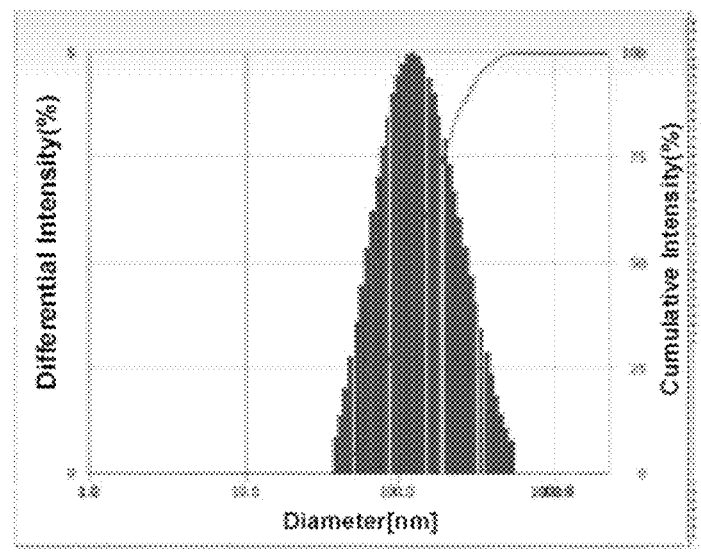
FIG. 2 is a graph showing results of analyzing particle diameters of nanoparticles of methoxy polyethyleneglycol-polycaprolactone copolymer according to Example of the present invention.
Figure 3:
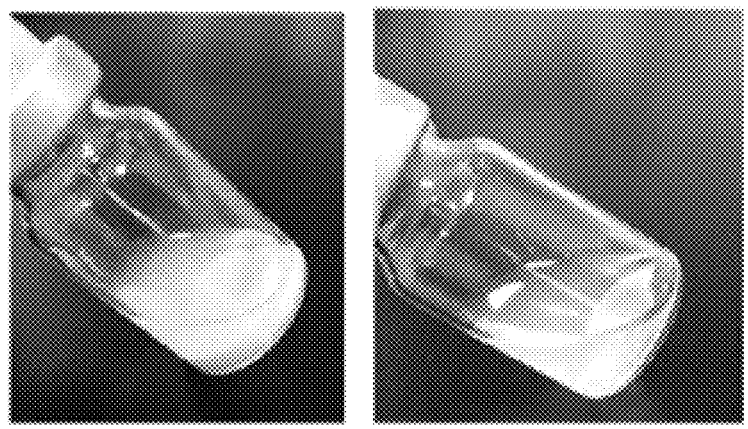
FIG. 3 is photographs showing results of comparing properties after storage of the injection compositions containing the products of Comparative Example 2 and Example, respectively, at 37° C. for 24 hours.

Comparison Between Formulations of Methoxy Polyethyleneglycol-Polycaprolactone Copolymer Nanoparticles Depending on Temperature After storing the products of Example and Comparative Example 2, respectively, at 37° C. for 24 hours, properties depending on temperature were compared, and results thereof are shown in FIG. 3. As a result of the experiment, the formulation of methoxy polyethyleneglycol-polycaprolactone copolymer nanoparticles with a high proportion of hydrophobic polymer according to Comparative Example 2 showed formation of precipitates due to recombination of particles, and irregular particles were formed. However, the formulation of methoxy polyethyleneglycol-polycaprolactone copolymer nanoparticles of Example did not produce precipitates.

Experimental Example 2

Assessment of Tissue Restoration Effects of the Aqueous Solution of Methoxy Polyethyleneglycol-Polycaprolactone Copolymer Nanoparticles In order to assess the tissue restoration effects of the present invention, an experiment was performed as follows.

An injection including the product of Comparative Example 1, which is 0.1 ml of microparticle composition, was used as a control group, while an injection including the product of Example, which is 0.1 ml of methoxy polyethyleneglycol-polycaprolactone copolymer nanoparticle composition, was used as an experimental group.

For an experiment of injecting the injection, SD white rat (SD Rat, Lion Bio Co., Ltd., Korea) was used. Each rat was anesthetized with isoflurane gas (Hana Pharm Co., Ltd., Korea) before injection. Once the sedation was clearly observed, the animal was placed on a surgical table in a supine position, and the claws were tied up with elastic strips. A 2×1 cm surface of the rat's scalp was depilated.

Figure 4:
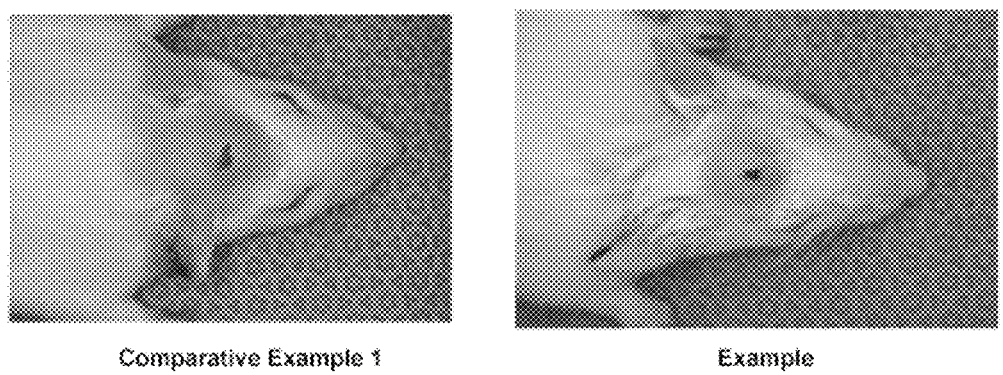
FIG. 4 is photographs showing a site of SD white rat filled with the product of Example, that is, the injectable formulation of the present invention after injecting the same in Experimental Example 1 of the present invention.

The panning technique was used to inject the material into the scalp at a uniform pressure using a disposable insulin syringe 26G. An injection part was selected at one place on the head, followed by injection (FIG. 4).

Three (3) months after the injection, more than 2×1 cm$^2$ of the injection site was dissected to completely remove a part in which all nodular sites from the skin having nodules formed thereon and even to the upper layer of the superficial muscle are included.

Figure 5:
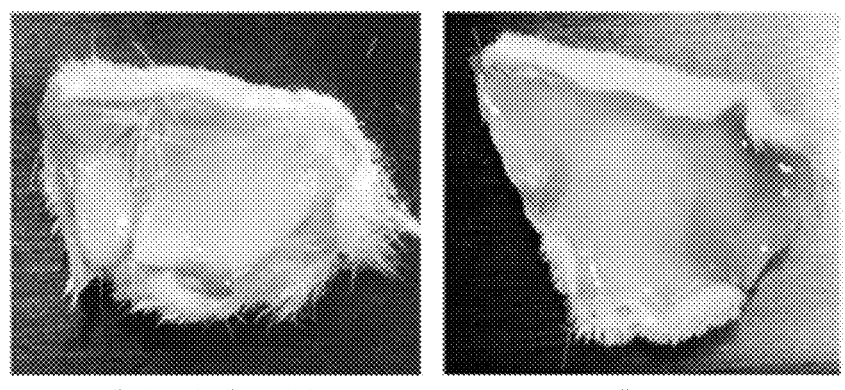
FIG. 5 shows histological test results for the sites injected with the products of Comparative Example 1 and Example, respectively, in Experimental Example 1 of the present invention.

Three (3) months after the injection, scalp tissues at the injection site of the SD white rat are shown in FIG. 5.

As a result of the experiment, when visually observing the extracted skin tissue 3 months after application of the test material, the nodules due to the injection were detected in the scalp tissue of the control group while the nodules due to the injection were not observed in the experimental group.

Figure 6:
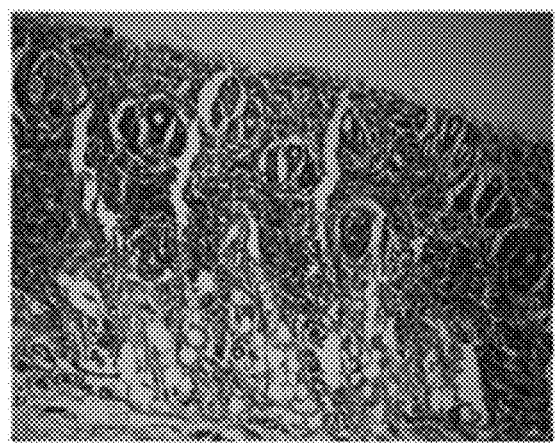
FIG. 6 is photographs showing collagen formed in the skin tissues at the injection sites of Comparative Example 1 and Example, respectively.
Figure 6:
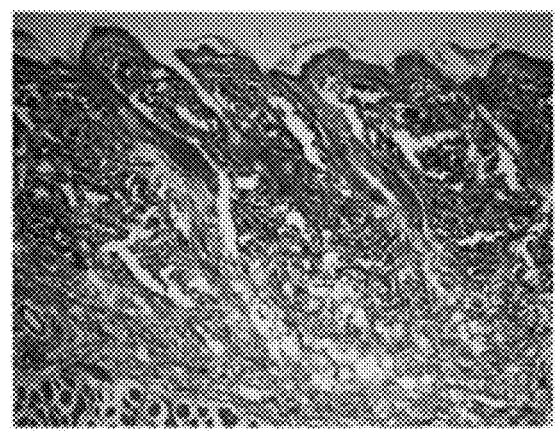

Further, the injection sites of the experimental group and the control group were subjected to histological examination. Particularly, the skin of the injection site of the SD white rat was extracted and subjected to the histological examination. As a result of the examination, it was observed that nanoparticles were mutually bound and existed at the injection site due to absorption of aqueous solution in the tissue, and further were present along with collagen. These results are shown in FIG. 6.

Experimental Example 3

Quantitative Evaluation of Collagen Production

In order to quantitatively determine a change in collagen of Experimental Example 2, the scalp tissues of SD white rat at 4 weeks, 8 weeks and 12 weeks after the injection of the test material were dissected and obtained.

Figure 7:
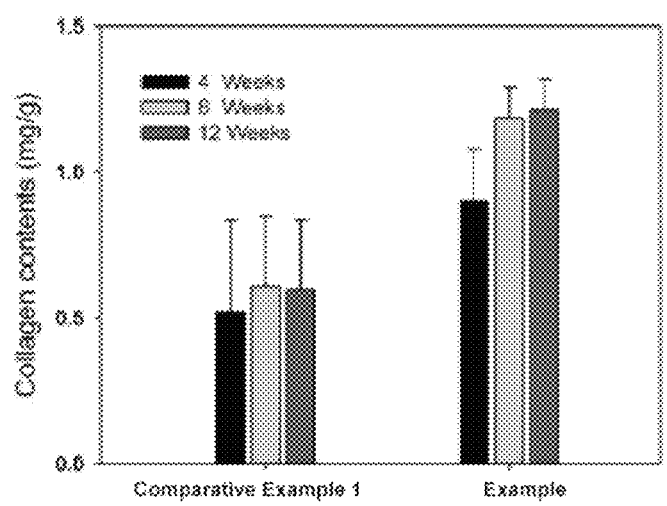
FIG. 7 is a graph quantitatively illustrating the amounts of collagen formed in the skin tissues at the injection sites of Comparative Example 1 and Example, respectively.

A weight of the scalp tissue was quantified, and a 10-fold amount of 0.5 M acetic acid solution was added, stirred at 4° C. for 18 hours and centrifuged (15,000 g, 60 minutes), in order to collect a supernatant till reaching a total volume of 100 µl. After adding 1 ml of sircol dye reagent to combine collagen with the dye reagent and centrifuging the same (10,000 g, 10 minutes), 1 ml of alkali reagent was added to the obtained precipitate, followed by measuring absorbance at 540 nm using a soluble collagen assay kit (Sircol™, Biocolor Ltd., Ireland) thus to determine a quantitative amount of collagen in each tissue, and the compared results are shown in FIG. 7.

As a result of the experiment, the control group injected with the product of Comparative Example 1 showed slight increase in collagen from 0.51 mg/g at 4 weeks to 0.6 mg/g at 8 weeks, while the amount was very little changed at 12 weeks. On the other hand, the experimental group injected with the product of Example was confirmed that the collagen was increased from 0.88 mg/g at 4 weeks to 1.22 mg/g at 12 weeks by 0.34 mg/g.

What is claimed is:

1. A composition for restoration of tissue comprising a biodegradable polymeric copolymer obtained by polymerizing caprolactone and methoxy polyethyleneglycol,
    wherein the caprolactone and methoxy polyethyleneglycol are polymerized in a weight ratio of caprolactone to methoxy polyethyleneglycol of 10:21;
    wherein the polymeric copolymer forms nanoparticles through self-assembly at room temperature; and
    wherein the polymeric copolymer has an average molecular weight of 3,100 g/mol.

2. The composition for restoration of tissue according to claim 1, wherein the copolymer has a particle diameter of 50 nm to 300 nm.

3. The composition for restoration of tissue according to claim 1, wherein the copolymer is included in an amount of 0.1 to 30% (w/w) in an aqueous solution.

* * * * *